United States Patent
Chung et al.

(10) Patent No.: US 7,412,093 B2
(45) Date of Patent: Aug. 12, 2008

(54) HYBRID APPARATUS FOR RECOGNIZING ANSWER TYPE

(75) Inventors: Eui Sok Chung, Taejon (KR); Soojung Lim, Taejon (KR); Yi Gyu Hwang, Taejon (KR); Myung Gil Jang, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 741 days.

(21) Appl. No.: 11/071,446

(22) Filed: Mar. 4, 2005

(65) Prior Publication Data

US 2006/0136208 A1 Jun. 22, 2006

(30) Foreign Application Priority Data

Dec. 17, 2004 (KR) .................. 10-2004-0108121

(51) Int. Cl.
*G06K 9/00* (2006.01)
*G06F 7/00* (2006.01)

(52) U.S. Cl. ......................... 382/181; 707/6
(58) Field of Classification Search ............... None
See application file for complete search history.

(56) References Cited

U.S. PATENT DOCUMENTS

| 6,052,682 | A | 4/2000 | Miller et al. | |
| 7,092,870 | B1* | 8/2006 | Chen et al. | 704/9 |
| 2002/0120616 | A1* | 8/2002 | Yun et al. | 707/3 |
| 2002/0154817 | A1* | 10/2002 | Katsuyama et al. | 382/190 |

FOREIGN PATENT DOCUMENTS

KR   1020040050461   6/2004

OTHER PUBLICATIONS

Euisok Chung, et al.; Hybrid Named Entity Recognition for Question-Answering System.
Rohini Srihari, et al.; A Hybrid Approach for Named Entity and Sub-Type Tagging; pp. 247-254.

* cited by examiner

*Primary Examiner*—Matthew C Bella
*Assistant Examiner*—Alex Liew
(74) *Attorney, Agent, or Firm*—Lowe Hauptman Ham & Berner LLP

(57) ABSTRACT

An apparatus and a hybrid method for recognizing answer type are disclosed. The apparatus includes: a morpheme analyzer for analyzing morphemes of an input text; a syllabic answer type recognizer for extracting a predetermined size syllable from a morpheme list and recognizing an answer type based on the extracted syllable; a vocabulary feature recognizer for allocating feature to each morpheme and recognizing the feature; a vocabulary feature disambiguation unit for disambiguating vocabulary feature ambiguity of morphemes having more than one feature; a pattern rule answer type recognizer for recognizing an answer type by comparing a consecutive sequence of the morphemes and a consecutive sequence of constitutional features connected to the morphemes with a pre-constructed pattern rules; a statistic answer type recognizer for recognizing an answer type by implementing a statistic model; and an answer type sub-category recognizer for recognizing a sub-category of the recognized answer type classified to general category.

21 Claims, 26 Drawing Sheets

| FEATURE | REPRESENT |
|---|---|
| PART OF SPEECH OF CURRENT MORPHEME | PO |
| VOCABULARY OF CURRENT MORPHEME | LO |
| FEATURE UNIT OF CURRENT MORPHEME | FO |
| FEATURE UNIT OF CURRENT MORPHEME | FO |
| PARTS OF SPEECH OF ADJACENT MORPHEMES | P-m, ... ,P-1, P+1, ... , P+m |
| VOCABULARIES OF ADJACENT MORPHEMES | L-m, ... ,L-1, L+1, ... , L+m |
| FEATURE UNITS OF ADJACENT MORPHEMES | F-m, ... ,F-1, F+1, ... , F+m |

- forward
  $T_{-1}L_{-1}T_0$, $L_{-1}L_0T_0$, $T_{-1}P_{-1}T_0$, $P_{-1}P_0T_0$, $T_{-1}F_{-1}T_0$, $F_{-1}F_0T_0$, $L_{-1}T_0$, $P_{-1}T_0$, $F_{-1}T_0$

- backward
  $T_1L_1T_0$, $L_0L_1T_0$, $T_1P_1T_0$, $P_0P_1T_0$, $T_1F_1T_0$, $F_0F_1T_0$, $L_1T_0$, $P_1T_0$, $F_1T_0$

- current
  $L_0T_0$, $P_0T_0$, $F_0T_0$

FIG. 8a

NAME OF PERSON

| PERSON | PS_NAME |
|---|---|
|  | PS_MYTH |

FIG. 8b

FIELD OF STUDY

| STUDY_FIELD | FD_SCIENCE |
|---|---|
|  | FD_SOCIAL_SCIENCE |
|  | FD_MEDICINE |
|  | FD_ART |
|  | FD_PHILOSOPHY |
|  | FD_OTHERS |

FIG. 8c

THEORY

| THEORY | TR_SCIENCE |
|---|---|
|  | TR_TECHNOLOGY |
|  | TR_SOCIAL_SCIENCE |
|  | TR_ART |
|  | TR_PHILOSOPHY |
|  | TR_REMEDY |
|  | TR_DIAGNOSIS |
|  | TR_OTHERS |

FIG. 8d

ARTIFACTS

| ARTIFACTS | AF_CULTURAL_ASSET | | |
| --- | --- | --- | --- |
| | AF_BUILDING | | |
| | AF_MUSICAL_INSTRUMENT | | |
| | AF_ROAD | | |
| | AF_WEAPON | | |
| | AF_TRANSPORT | | |
| | AF_WORKS | AFW_GEOGRAPHY | |
| | | AFW_MEDICAL_SCIENCE | |
| | | AFW_RELIGION | |
| | | AFW_PHILOSOPHY | |
| | | AFW_ART | AFWA_DANCE |
| | | | AFWA_MOVIE |
| | | | AFWA_LITERATURE |
| | | | AFWA_ART_CRAFT |
| | | | AFWA_THEATRICALS |
| | | | AFWA_MUSIC |

FIG. 8e

NAME OF ORGANIZATION

| ORGANIZATION | OG_GROUP | OGG_ECONOMY |
| --- | --- | --- |
| | | OGG_EDUCATION |
| | | OGG_MILITARY |
| | | OGG_MEDIA |
| | | OGG_SPORTS |
| | | OGG_ART |
| | | OGG_SOCIETY |
| | | OGG_MEDICINE |
| | | OGG_RELIGION |
| | | OGG_SCIENCE |
| | | OGG_BUSINESS |
| | | OGG_LIBRARY |
| | | OGG_LAW |
| | | OGG_POLITICS |
| | | OGG_RESEARCH |
| | OG_CONFERENCE | OGC_ECONOMY |
| | | OGC_MILITARY |
| | | OGC_POLITICS |
| | OG_OTHERS | |

FIG. 8f

NAME OF PLACE

| LOCATION | LC_PLACE | LCP_COUNTRY |
| | | LCP_PROVINCE |
| | | LCP_COUNTY |
| | | LCP_CITY |
| | | LCP_CAPITALCITY |
| | | |
| | LC_GEO_AREA | LCG_RIVER |
| | | LCG_CANYON |
| | | LCG_OCEAN |
| | | LCG_CAVE |
| | | LCG_PLATEAU_VALLY |
| | | LCG_BAY |
| | | LCG_MOUNTAIN |
| | | LCG_DESERT |
| | | LCG_ISLAND |
| | | LCG_HOTSPRING |
| | | LCG_TOPOGRAPHY |
| | | LCG_PLAIN |
| | | LCG_CONTINENT |
| | | |
| | LC_TOUR | |
| | LC_LODGING | |
| | LC_SPACE | LCS_STAR |
| | | LCS_PLANET |
| | | LCS_CONSTELLATION |
| | LC_OTHERS | |

FIG. 8g

CULTURE/CIVILIZATION

| | | |
|---|---|---|
| CIVILIZATION | CV_NAME | |
| | CV_TRIBE | |
| | CV_SPORTS | |
| | CV_POLICY | |
| | CV_TAX | |
| | CV_FUNDS | |
| | CV_LANGUAGE | |
| | CV_BUILDING_TYPE | |
| | CV_FOOD | |
| | CV_DRINK | |
| | CV_CLOTHING | |
| | CV_POSITION | |
| | CV_RELATION | |
| | CV_OCCUPATION | |
| | CV_CURRENCY | |
| | CV_PRIZE | |
| | CV_LAW | CVL_RIGHT |
| | | CVL_CRIME |
| | | CVL_PENALTY |

FIG. 8h

DATE

| DATE | DT_DURATION |
|---|---|
| | DT_DAY |
| | DT_MONTH |
| | DT_YEAR |
| | DT_SEASON |
| | DT_GEOAGE |
| | DT_DYNASTY |
| | DT_OTHERS |

FIG. 8i

TIME

| TIME | TI_DURATION |
|---|---|
| | TI_HOUR |
| | TI_MINUTE |
| | TI_SECOND |
| | TI_OTHERS |

FIG. 8j

QUANTITY

| QUANTITY | QT_AGE |
| --- | --- |
| | QT_SIZE |
| | QT_LENGTH |
| | QT_COUNT |
| | QT_WEIGHT |
| | QT_PERCENTAGE |
| | QT_SPEED |
| | QT_DISTANCE |
| | QT_TEMPERATURE |
| | QT_VOLUME |
| | QT_ORDER |
| | QT_PRICE |
| | QT_HEIGHT |
| | QT_OTHERS |

FIG. 8k

EVENT

| EVENT | EV_ACTIVITY |
| --- | --- |
| | EV_WAR_REVOLUTION |
| | EV_SPORTS |
| | EV_FESTIVAL |
| | EV_OTHERS |

FIG. 8l

ANIMAL

| ANIMAL | AM_INSECT |
| | AM_BIRD |
| | AM_FISH |
| | AM_MAMMALIA |
| | AM_AMPHIBIA |
| | AM_REPTILIA |
| | AM_TYPE |
| | AM_OTHERS |

FIG. 8m

PLANT

| PLANT | PT_FRUIT |
| | PT_FLOWER |
| | PT_TREE |
| | PT_GRASS |
| | PT_TYPE |
| | PT_OTHERS |

FIG. 8n

MATERIAL

| MATERIAL | MT_ELEMENT | |
| --- | --- | --- |
| | MT_METAL | |
| | MT_ROCK | |
| | MT_CHEMICAL | MTC_LIQUID |
| | | MTC_GAS |

FIG. 8o

TERM

| TERM | TM_COLOR | |
| --- | --- | --- |
| | TM_DIRECTION | |
| | TM_CLIMATE | |
| | TM_CELL_TISSUE | |
| | TM_MEDICINE | TMM_DISEASE |
| | | TMM_DRUG |
| | | TMM_CHEMICALMAT |
| | | |
| | TM_IT | TMI_HW |
| | | TMI_SW |
| | | TMI_SPECIAL_TERM |
| | | TMI_SITE |

FIG. 9

| CLASS | TYPE OF FEATURE |
|---|---|
| TEXT TYPE FEATURE (3b-1) | *WFID_OneDigitNum, WFID_TwoDigitNum, WFID_FourDigitNum WFID_AllDigitNum, WFID_ContainsDigitAndPeriod, WFID_AllCapitalization, WFID_ContainsCapitalPeriodHangul* |
| ANSWER TYPE FEATURE (3b-2) | *FID_PS_NAME, FID_PS_MYTH, FID_FD_SCIENCE, FID_FD_SCIENCE, FID_FD_SOCIAL_SCIENCE, FID_FD_MEDICINE, FID_FD_ART, FID_FD_PHILOSOPHY* ... |
| COMBINED NOUN/SUFFIX FEATURE (3b-3) | *SuffixPERCENT, SuffixMONEY, SuffixCURRENCY, SuffixTIME, PeriodTIME, SuffixDATE, WeekDATE, SeasonDATE, PeriodDATE, YearDATE, OthersDATE, DistrictSuffixLOC, SuffixLOC, SuffixORG* |
| ADJACENT NOUN FEATURE (3b-4) | *PositionPERSON, RelationPERSON, JobPERSON, ClueLOC, ClueDATE, ClueTIME, CluePHONE, ClueORG, CluePERCENT, ClueMONEY, ClueADDRESS, ClueQUANTITY* |
| VOCABULARY MEANING FEATURE (3b-5) | BUILDING,TOOL,INANIMATE OBJECT,METHOD,HUMAN,POSITION, THOUGHT,LIVING SUPPLIES,FIGHTING,WORK,PLACE,REUNION,SYSTEM |

FIG. 10

```
/ID   174915
/TI   < WHIMPER:PS_NAME>
/OF   <CLIMBER: CV_OCCUPATION> OF <ENGLAND: LCP_COUNTRY>

NATIONALITY : <ENGLAND: LCP_COUNTRY>
FIELD : LEISURE
BIRTHPLACE: <LONDON: LCP_CAPITALCITY>
MAIN WORKS: 《<SCAMBLES AMONGST THE ALPS:AF_WORKS>
SCRAMBLES AMONGST THE ALPS》 (<1871:DT_YEAR>)
《<TRAVELS AMONGST THE GREAT ANDES OF THE ECUADOR>
TRAVELS AMONGST THE GREAT ANDES OF THE ECUADOR》 (<1891~1892:DT_DURATION>)

HE WAS BORN IN <LONDON: LCP_CAPITALCITY> ON <APRIL 27, 1840: DT_OTHERS>.
HE IS <ONE PERSON: QT_COUNT> OF FAMOUS <SCRAMBLERS: CV_OCCUPATION>
IN <ALPS: LCG_MOUNTAIN> GOLEN AGE. HE FIRST SCRAMBLED THE
IMPREGNABLE <MATTERHORN: LCG_MOUNTAIIN> IN <1865: DT_YEAR>,
BUT A CLIMBING ROPE WAS CUT WHEN DESCENDING THE MOUNTAIN SO THAT
<FOUR: QT_COUNT> OF <SEVEN PERSONS: QT_COUNT> WERE CRASHED.
THIS DISATER WAS WIDELY KNOWN. THOUGH HE WAS SERIOUSLY
WOUNDED AT THIS ACCIDENT, HE CONTINUED TO SCRAMBLE MANY MOUNTAINS.
HE MADE AN EXPEDITION TO <GREENLAND: LCG_ISLAND> IN <1867: DT_YEAR>
AND <1872:DT_YEAR> AND HE FIRST CLIMBED <CHIMBORAZO MOUNTAIN: LCG_MOUNTAIN>
OF <ANDES: LC_OTHERS> IN <1880: DT_YEAR>.
HE MADE AN EXPEDITION TO <LOCKY MOUNTAINS: LCG_MOUNTAIN>
OF <CANADA: LCP_COUNTRY> IN <1901: DT_YEAR> AND FIRST CLIMBED
<SERVERAL: QT_COUNT> MOUNTAIN PEAKS.
HE WAS ADMITTED INTO <ALPINE CLUB: OGG_SPORTS>
IN <1861: DT_YEAR> AND HELD THE POST OF <VICEPRESIDENT: CV_POSITION>
OF THE CLUB IN <1872-1874: DT_DURATION>.
HE WROTE 《<SCRAMBLES AMONGST THE ALPS: AF_WORKS> SCAMBLES AMONGST THE ALPS》
IN (<1871: DT_YEAR>), 《<TRAVELS AMOST THE GREAT ANDES OF THE ECUADOR: AF_WORKS>
TRAVELS AMOST THE GREAT ANDES OF THE ECUADOR》
IN (<1891-1892: DT_DURATION>), AND SO ON.
```

HYBRID APPARATUS FOR RECOGNIZING ANSWER TYPE

BACKGROUND OF THE INVENTION

1. Field of the Invention

The present invention relates to a hybrid apparatus for recognizing answer type, and more particularly, to a hybrid model and method for recognizing answer types in order to recognize a Korean answer type.

2. Description of the Related Art

Generally, a named entity recognition scheme extracts core information from a text and it is a necessary function to be included in a question and answer system or a text mining system. Particularly, a named entity recognizer is a major module of a FLACON's question and answer system or an IBM's question and answer system for recognizing an answer type. That is, the named entity recognizer recognizes the answer type and generates correct answer in the question and answer system. Although the answer type is not exactly matched with a recognized named entity, the named entity recognition scheme can be used for recognizing the answer type. The answer type for the question and answer system requires more categories than the named entity recognition.

The named entity recognition scheme has been technologies. Statistical approaching methods are generally used as the named entity recognition scheme and among the statically approaching methods, a hidden markov model (HMM) or a maximum-entropy (ME) have been widely used. In the HMM or the ME, a named entity type is allocated to target vocabulary based on a history information. For English, a Bikel shows 90% of F-measure by using a simple vocabulary feature and a Zhou introduces a HMM based named entity recognition method using complex features and it has 93.4% of F-measure.

A Srihari's model is one of representative model for a hybrid method as a sub categorized named entity recognition. In the Srihari's model, a named entity is recognized by using the ME model, the HMM model and a grammar model generated by manual work. And the Srihari's model also introduces the sub categorized recognition method by using the ME model. However, a pattern rule is constructed based on manual work and it has been introduced a sub categorized recognition scheme using an external dictionary information instead of using a named entity tagged corpus.

A conventional hybrid approach has been used for recognizing a Korean named entity by using a ME model, a neural network and a pattern selection rule. The hybrid method shows 84.09% as F-measure when the named entity type is person, place and organization. Considering a performance of Korean named entity recognition it is lower than the performance of English named entity recognition. It is because there is no capital letter feature of a proper noun in Korean. The English includes the capital letter feature in a proper noun. In the view of no capital letter feature in Korean, the conventional research may be adaptable. However, the conventional hybrid method is a test based study using simple named entities as target entities and there is no method introduced for recognizing mess amount of answer types.

SUMMARY OF THE INVENTION

Accordingly, the present invention is directed to a hybrid apparatus for recognizing Korean answer type.

It is an object of the present invention to provide a hybrid apparatus for recognizing Korean answer type for an encyclopedia area of a question and answer system.

It is another object of the present invention to provide a hybrid apparatus for recognizing Korean answer type in order to recognize a target named entity constructed with about 160 named entities from 7 named entities constructed based on a proper noun including a name of person, a name of place and a name of organization.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an hybrid apparatus for recognizing answer type, the apparatus including: a morpheme analyzer for analyzing morphemes of an input text; a syllabic answer type recognizer for extracting a predetermined size of syllable from a morpheme list analyzed by the morpheme analyzer and recognizing an answer type based on the extracted syllable; a vocabulary feature recognizer for allocating corresponding feature to each of morphemes constructing the morpheme list and recognizing the corresponding feature of each morpheme; a vocabulary feature disambiguation unit for disambiguating vocabulary feature ambiguity of morphemes having more than one feature recognized at the vocabulary feature recognizer; a pattern rule based answer type recognizer for recognizing an answer type by comparing a consecutive sequence of the morphemes and a consecutive sequence of constitutional features connected to the morphemes with a pre-constructed pattern rules; a statistic answer type recognizer for recognizing an answer type by implementing a statistic model to the consecutive sequence of the morphemes and the consecutive sequence of constitutional features connected to the morphemes; and an answer type sub-category recognizer for recognizing a sub-category of the recognized answer type classified to general category at the statistic answer type recognizer.

In another aspect of the present invention, there is provided a hybrid method for recognizing answer type, the method including steps of: a) analyzing morphemes of an input text; b) extracting a predetermined size of syllable from a morpheme list analyzed by the morpheme analyzer and recognizing an answer type based on the extracted syllable; c) allocating corresponding feature to each of morphemes constructing the morpheme list and recognizing the corresponding feature of each morpheme; d) disambiguating vocabulary feature ambiguity of morphemes having more than one feature recognized at the vocabulary feature recognizer; e) recognizing an answer type by comparing a consecutive sequence of the morphemes and a consecutive sequence of constitutional features connected to the morphemes with a pre-constructed pattern rules; f) recognizing an answer type by implementing a statistic model to the consecutive sequence of the morphemes and the consecutive sequence of constitutional features connected to the morphemes; and g) recognizing a sub-category of the recognized answer type classified to general category at the statistic answer type recognizer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings:

FIG. 6a is a diagram illustrating a statistic answer type recognizer 600 in FIG. 1;

FIG. 6b is a table showing context features of an answer type target vocabulary used for statistic answer type recognition in FIG. 6a;

FIG. 6c shows types of context feature templates implemented to a maximum entropy statistic model in FIG. 6a;

FIG. 6d shows a feature list and weights allocated to the feature list implemented to the maximum entropy statistic model in FIG. 6a.

FIGS. 8a to 8o show answer type used to a question and answer system;

FIG. 9 is a table showing a sub feature type for recognizing an answer type;

FIG. 10 shows an example of an answer type tagging document for extracting various linguistic information for recognizing an answer type;

FIG. 12b is a detailed flowchart showing the learning data of syllabic answer type construction step S301 in FIG. 12a;

FIG. 13b is a detailed flowchart of the learning data construction step 501 in FIG. 13a;

FIG. 14b is a detailed flowchart showing the pattern rule construction step S601 in FIG. 14a;

FIG. 15b is a detailed flowchart for explaining the statistic answer type recognition step S701 in FIG. 15a;

FIG. 16b is a detailed flowchart of the statistic information construction step S801 in FIG. 16a.

DETAILED DESCRIPTION OF THE INVENTION

Reference will now be made in detail to the preferred embodiments of the present invention, examples of which are illustrated in the accompanying drawings.

Figure 1:
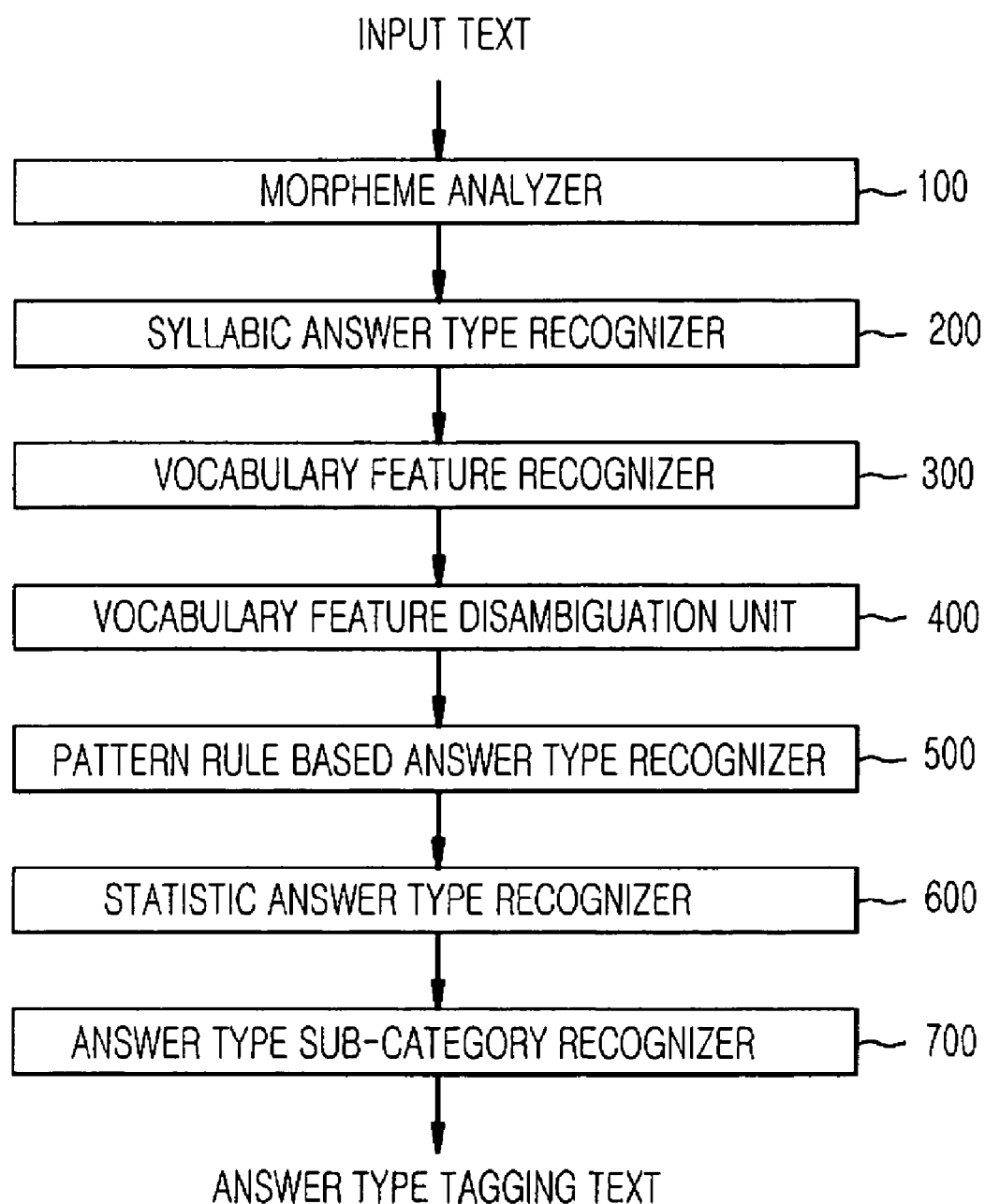
FIG. 1 is a block diagram showing an hybrid apparatus for recognizing answer type in accordance with a preferred embodiment of the present invention.

FIG. 1 is a block diagram showing a hybrid apparatus for recognizing answer type in accordance with a preferred embodiment of the present invention.

As shown in FIG. 1. the apparatus includes a morpheme analyzer 100 for analyzing a morpheme of an input text; a syllabic answer type recognizer 200 for extracting a predetermined size of syllables from a list of the analyzed morphemes and recognizing the answer type based on the extracted syllables; a vocabulary feature recognizer 300 for recognizing features of vocabulary by allocating corresponding feature to the morphemes constructing the list of the analyzed morphemes; a vocabulary feature disambiguation unit 400 for disambiguating morphemes having more than one feature which are recognized by the vocabulary feature recognizer 300; a pattern rule based answer type recognizer 500 for recognizing the answer type by comparing a consecutive sequence of the morphemes and constitutional feature connected to the morphemes with a predetermined pattern rule; a statistic answer type recognizer 600 for recognizing the answer type by applying a statistic model to the consecutive sequence of the morphemes and constitutional features connected to the morphemes; and an answer type sub category recognizer 700 for recognizing a sub category of the answer type which is general category recognized by the statistic answer type recognizer 600.

Figure 2:
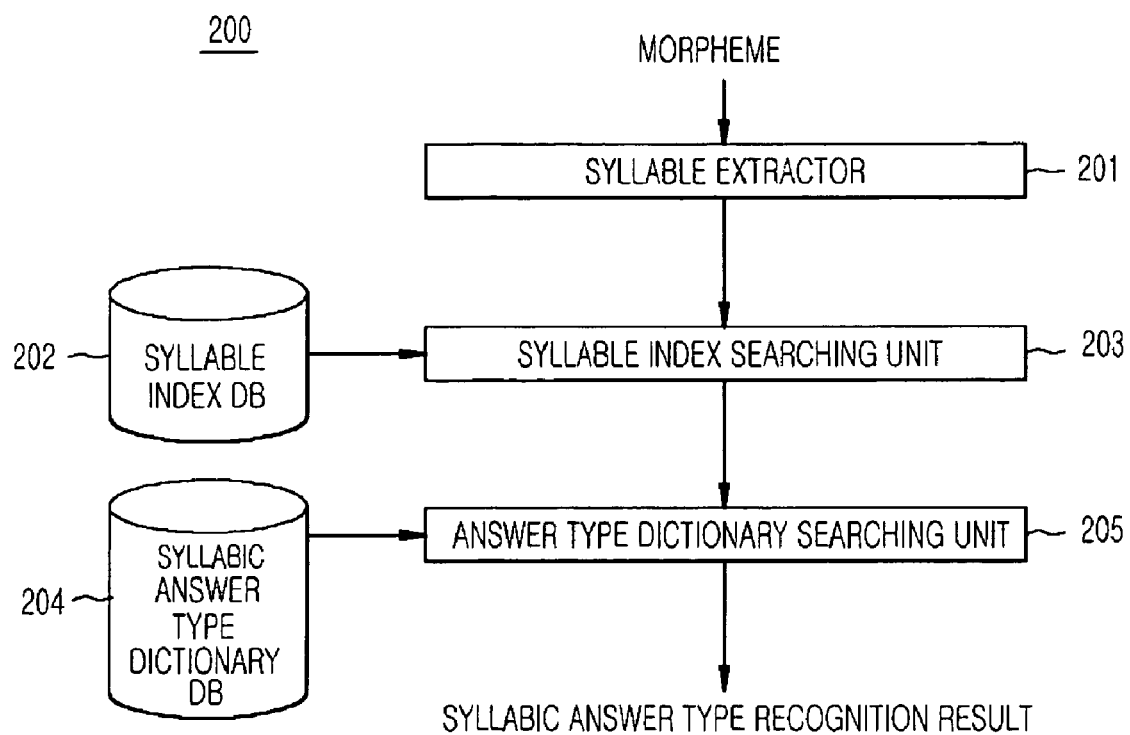
FIG. 2 is a detailed diagram showing a syllabic answer type recognizer 200 in FIG. 1.

FIG. 2 is a detailed diagram showing a syllabic answer type recognizer 200 in FIG. 1.

As shown in FIG. 2, the syllabic answer type recognizer 200 includes a syllabic extractor 201 for extracting a predetermined size (3 bytes) of syllables from the list of morphemes extracted at the morpheme analyzer 100; a syllable index DB 202 constructed by extracting a predetermined size (3 bytes) of syllabic indexes from answer types larger than the predetermined size (4 bytes) among answer types tagged at an answer type tagged to an answer type tagging corpus; a syllabic index searching unit 203 for inquiring the syllable index DB 202; a syllabic answer type dictionary DB 204 constructed by extracting an answer type entry according to each of corresponding syllable; an answer type dictionary searching unit 205 for searching the syllabic answer type dictionary DB 204 and outputting a syllabic answer type recognition result when an answer type vocabulary is existed in the answer type dictionary DB 204.

Figure 3:
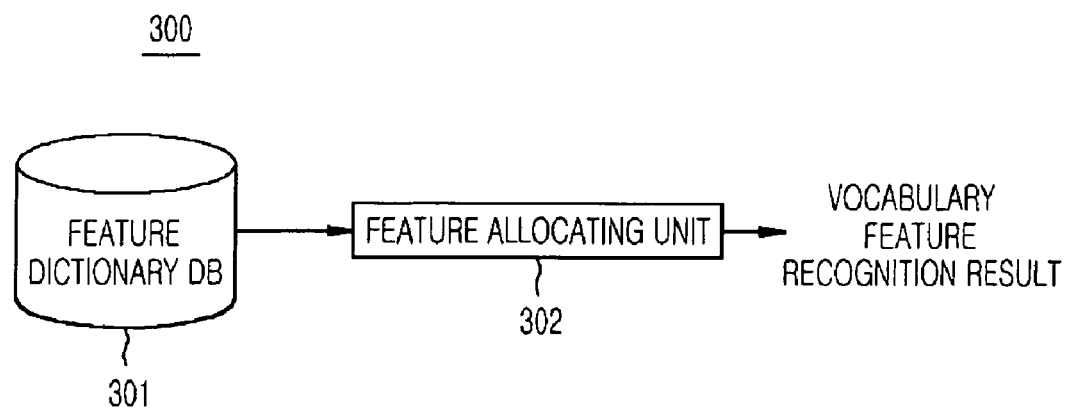
FIG. 3 is a detailed diagram of a vocabulary feature recognizer 300 in FIG. 1.

FIG. 3 is a detailed diagram of a vocabulary feature recognizer 300 in FIG. 1.

As shown in FIG. 3, the vocabulary feature recognizer 300 includes a feature dictionary DB 301 and a feature allocating unit 302 for searching the quality dictionary DB 301 and allocating corresponding feature to each of the morphemes.

Figure 4:
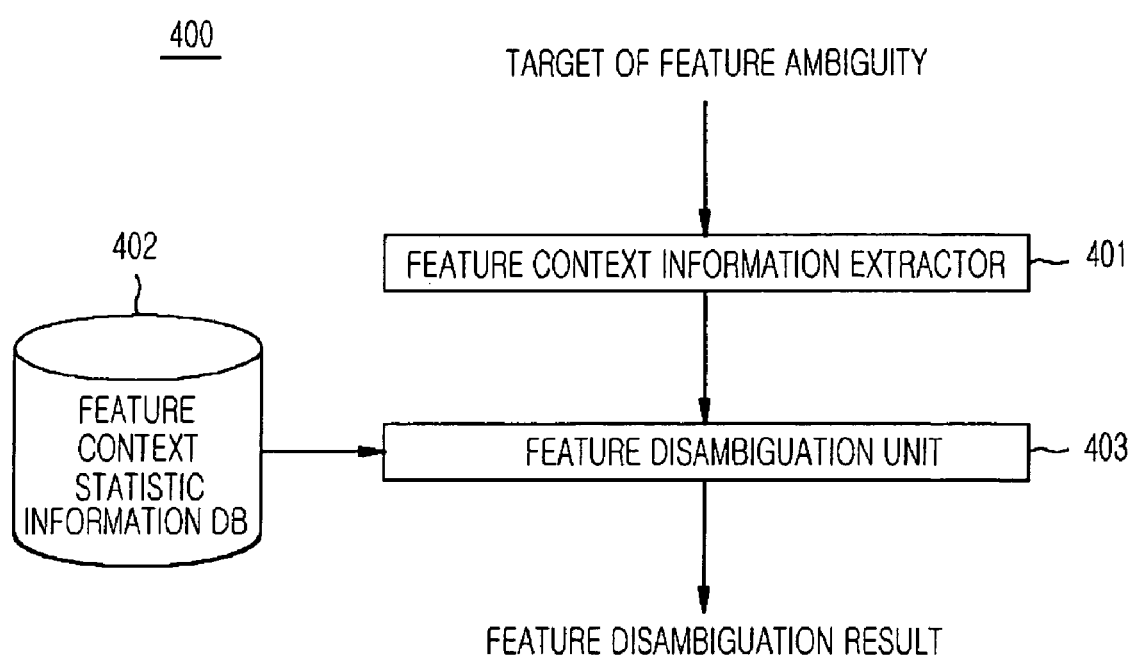
FIG. 4 is a detailed diagram illustrating a vocabulary feature disambiguation unit 400 in FIG. 1.

FIG. 4 is a detailed diagram illustrating a vocabulary feature disambiguation unit 400 in FIG. 1.

As shown in FIG. 4, the vocabulary feature disambiguation unit 400 includes a feature context information extractor 401 for extracting a feature context information from a target having feature ambiguity; a feature context statistic information DB 402 constructed by extracting feature content statistic information by using information of answer type data structure; and a feature disambiguation unit 403 for disambiguating vocabulary feature by using the extracted feature context information at the feature context information extractor 401 and the feature context statistic information stored in the feature context statistic information DB 402.

Figures 5A, 5B:
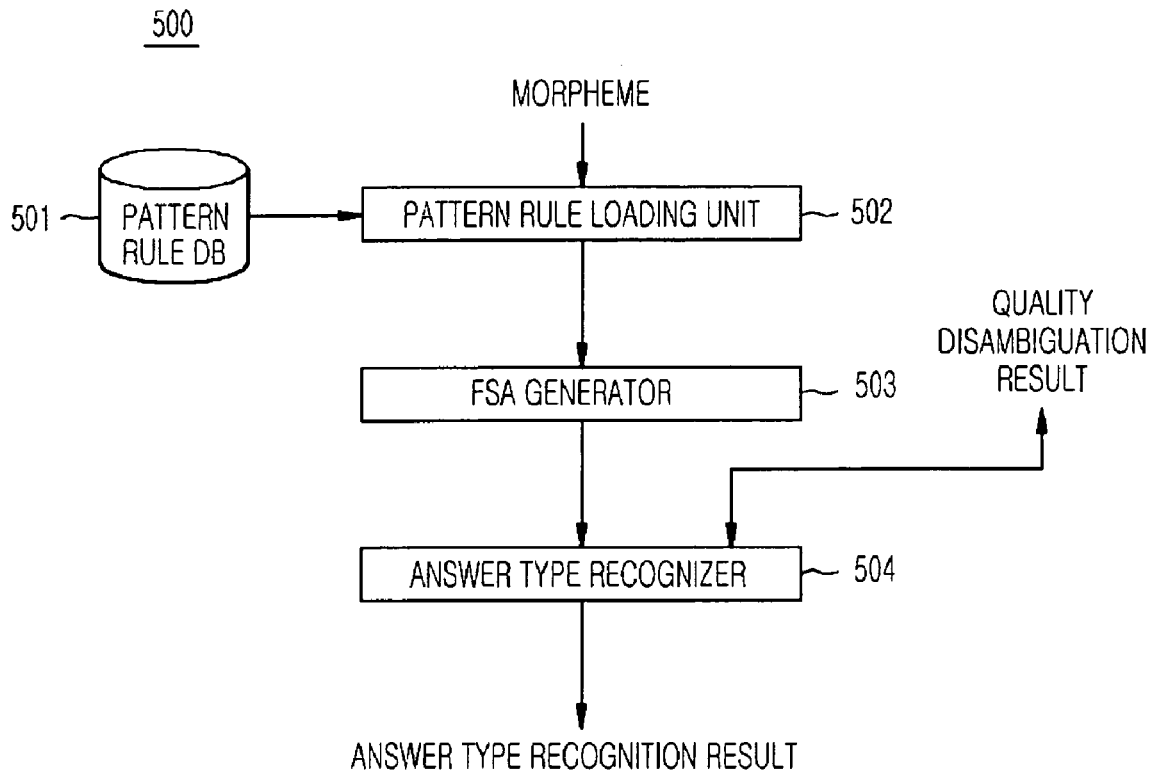
FIG. 5a is a block diagram showing a pattern rule based answer type recognizer 500 in FIG. 1.
FIG. 5b shows an example of a pattern rule for recognizing an answer type.

FIG. 5a is a block diagram showing a pattern rule based answer type recognizer 500 in FIG. 1.

As shown in FIG. 5a, the pattern rule based answer type recognizer 500 includes a pattern rule DB 501 constructed by extracting a pattern rule and filtering the extracted pattern rule; a patter rule loading unit 502 for loading the patter rules stored in the patter rule DB 501; a FSA generator 503 for generating a FSA by using the loaded pattern rule; an answer type recognizer 504 for recognizing an answer type by using the generated FSA and the feature disambiguation result, and outputting an answer type recognition result.

As shown in FIG. 5b, the pattern rule is constructed by "answer type=vocabulary/context/feature pattern"

Figures 6A, 6B:
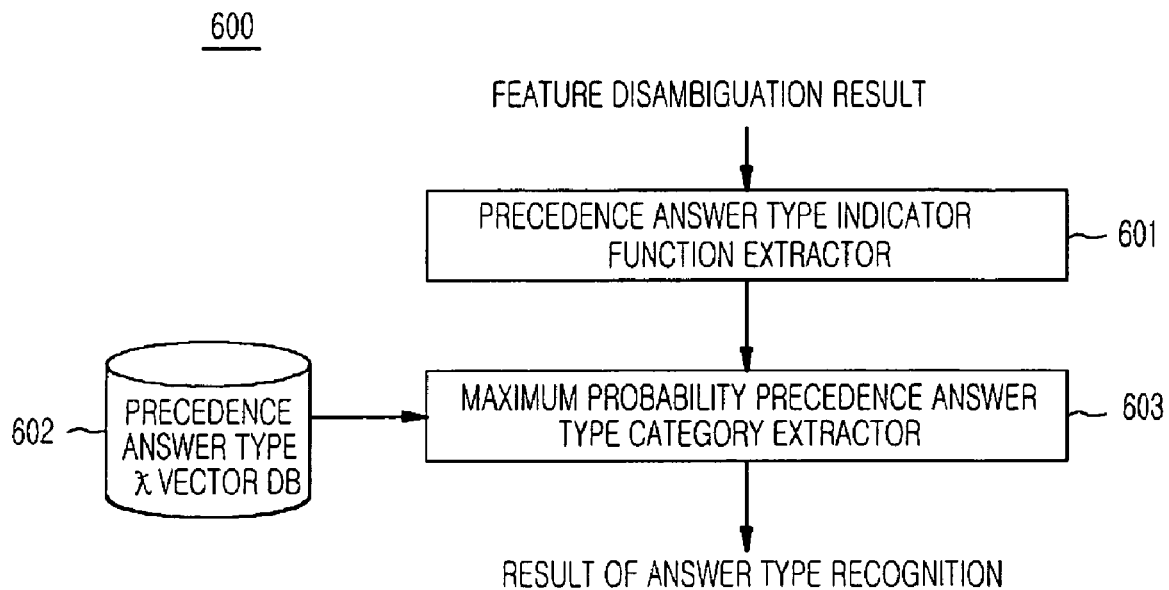

FIG. 6a is a diagram illustrating a statistic answer type recognizer 600 in FIG. 1.

As shown in FIG. 6a, the statistic answer type recognizer 600 includes a precedence answer type indicator function extractor 601 for extracting the precedence answer type indicator function by using the feature disambiguation result; a precedence answer type λ vector DB 602 constructed with precedence answer type λ vectors generated by using an IIS algorithm after extracting the precedence answer type indicator function; and a maximum probability precedence answer type category extractor 603 for outputting a maximum probability precedence answer type category by using the extracted precedence answer type indicator function and the precedence answer type vector stored in the precedence answer type λ vector DB 602.

Figure 7:
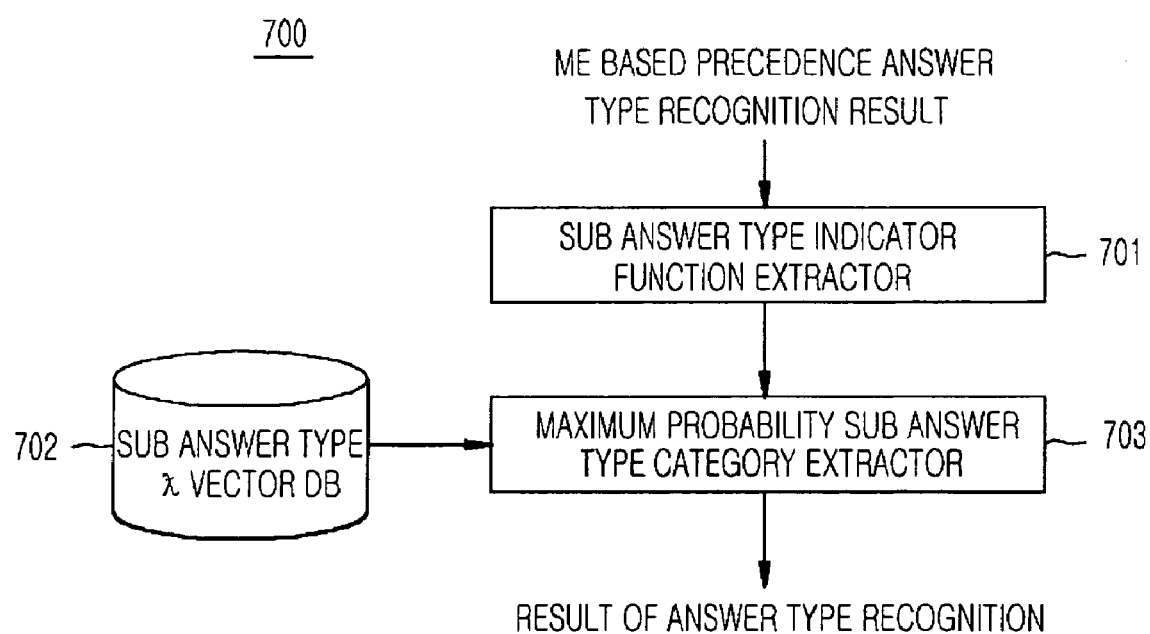
FIG. 7 is a diagram illustrating an answer type sub-category recognizer 700 in FIG. 1.

FIG. 7 is a diagram illustrating an answer type sub-category recognizer 700 in FIG. 1.

As shown in FIG. 7, the answer type sub-category recognizer 700 includes a sub answer type indicator function extractor 701 for extracting a sub answer type indicator function by using the ME based precedence answer type recognized at the statistic answer type recognizer 600;

a sub answer type λ vector DB 702 constructed with sub answer type λ vectors generated by using IIS algorithm after extracting the sub answer type indicator function;

A maximum probability sub answer type category extractor 703 for generating a maximum probability sub answer type category by using the extracted sub answer type indicator function and the sub answer type λ vector stored in the sub answer type λ vector DB 702.

Hereinafter, a hybrid method for recognizing answer type in accordance with a preferred embodiment of the present invention is explained by referring to the FIGS. 11 to 16b.

Figure 11:
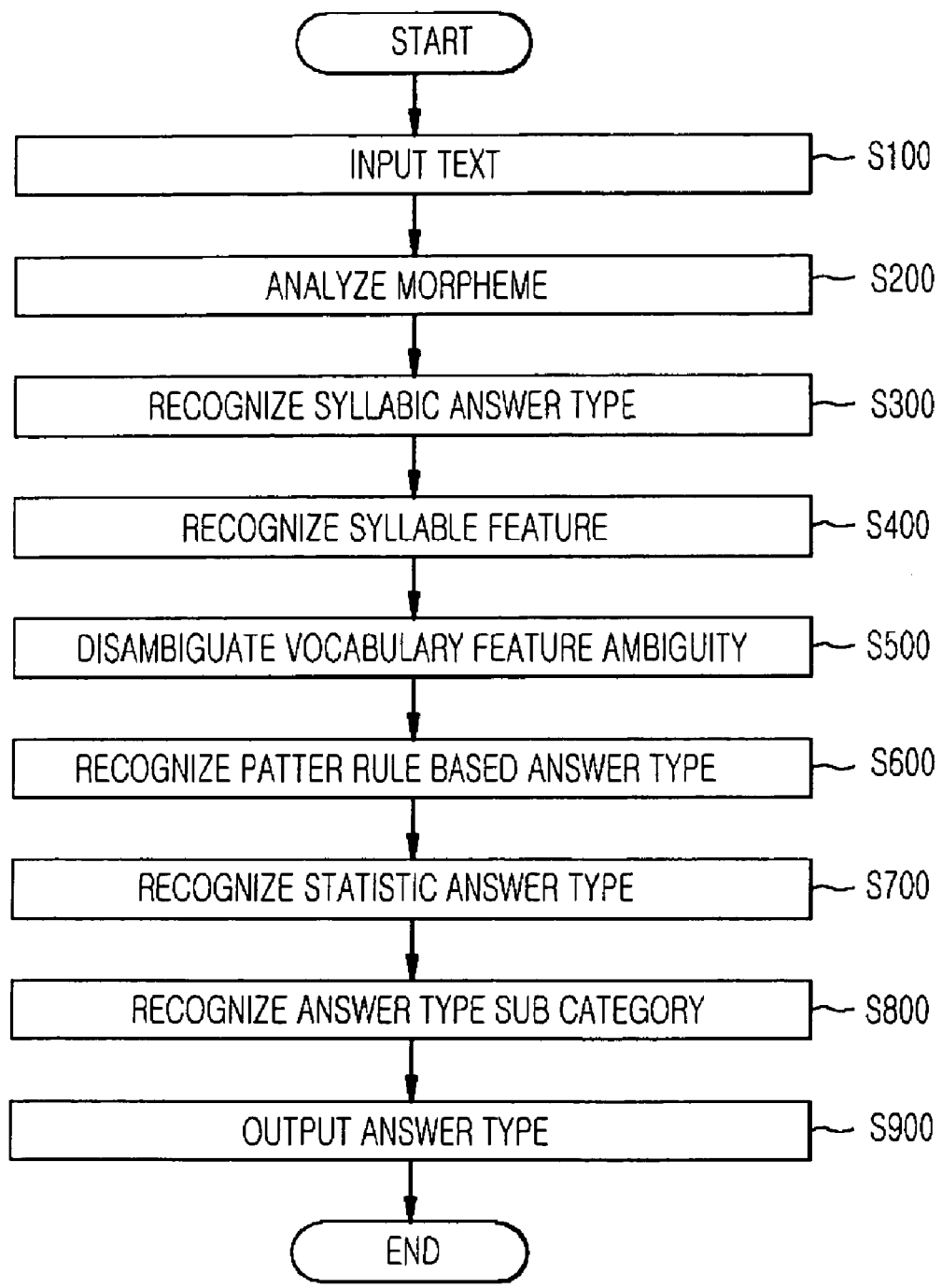
FIG. 11 is a flowchart showing a hybrid method for recognizing answer type in accordance with a preferred embodiment of the present invention.

FIG. 11 is a flowchart showing a hybrid method for recognizing answer type in accordance with a preferred embodiment of the present invention.

As shown in FIG. 11, when a text is inputted at step S100, the morpheme analyzer 100 analyzes morphemes of the inputted text and divides the inputted text to a plurality of morphemes step S200. The divided morphemes are tagged with a part of speech. The step S200 is performed by a Korean morpheme analyzer. The input text is divided to sentences. That is, the input text is a list of sentences. Each of sentences is constructed with a list of morphemes.

After dividing and tagging the input text, the syllabic answer type recognizer 200 extracts a predetermined size of syllable from each of the morphemes and recognizes a syllabic answer type at step S300. The predetermined size of syllable may be 6 bytes of a predetermined part of a vocabulary. That is, the predetermined part of the vocabulary is used as a key of syllable index answer type dictionary DB 204 for determining whether a target vocabulary is the answer type or not.

The vocabulary feature recognizer 300 performs a vocabulary feature recognition step S400 for allocating corresponding features to each morpheme in the morpheme list. A morpheme may have a suffix feature of "a name of organization". Also. A morpheme may have a suffix feature of "name of place". In the step S400, it determines what feature is included in each morpheme and feature information of each morpheme is stored in a morpheme data structure. The morpheme may include various features. For example, a morpheme of Korean word '군' (Mr. in English) may have an external feature of "a name of person" and also may have a feature of "a name of place". It is commonly called as a vocabulary feature ambiguity.

The word feature disambiguation unit 400 performs a vocabulary disambiguation step S400 for disambiguating the ambiguity of vocabulary feature. That is, the vocabulary feature disambiguation unit 400 allocates single feature to each morpheme. By allocating the single feature to each morpheme, a performances of the pattern rule based answer type recognition S500 and the statistic answer type recognition S600 may increase.

The pattern rule based answer type recognizer 500 performs a pattern rule based answer type recognition steps S600 for comparing a consecutive sequence of morphemes and a constitutional features connected to the morphemes with the pattern rules and recognizing the answer type. The pattern rule is implemented by using a finite-state automata (FSA) and it is generally used for recognizing standardized answer type such as 'date', 'currency', and 'volume'.

The statistic answer type recognizer 600 perform a statistic answer type recognition step S700 for recognizing the answer type by implementing a statistic model to the consecutive sequence of morphemes and constitutional features connected to the morphemes. The statistic model is used to recognize general category of answer type such as a name of person (PERSON), a field of study (STUDY_FIELD), a theory (THEORY), an artifacts (ARTIFACTS), a name of organization (ORGANIZATION), a name of place (LOCATION), a culture/civilization (CIVILIZATION), a data (DATE), a time (TIME), a quantity (QUANTITY), an event (EVENT), an animal (ANIMAL), a plant (PLANT), a material (MATERIAL), a term (TERM) by using a ME model.

The answer type sub category recognizer 700 performs a mess amount of answer type recognition step S800 for responding to various questions of the question and answer system. In the step S800, a sub category of general categorized answer types is recognized. That is, the generally recognized 15 categories of answer types are categorized to approximately 160 detail categories as shown in FIGS. 8a to 8o. It uses identical approach method used in the statistical answer type recognition step S700. Only difference is that a target object of tagging is previously recognized answer type.

Figure 12A:
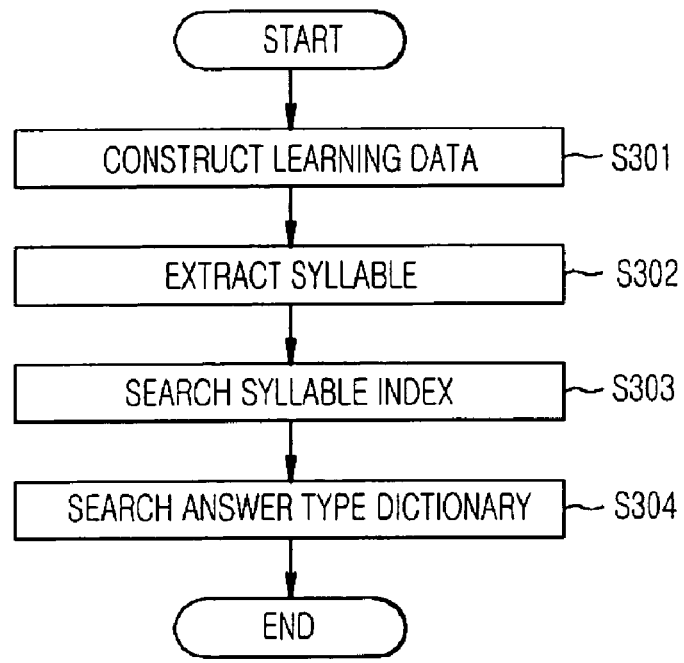
FIG. 12a is a detailed flowchart of the syllabic answer type recognition step S300 in FIG. 11.

FIG. 12a is a detailed flowchart of the syllabic answer type recognition step S300 in FIG. 11.

As shown in FIG. 12a, the syllable index DB 202 and the syllabic answer type dictionary DB 204 are generated by performing learning data of syllabic answer type construction step S301. In the step S301, the syllabic answer type is recognized by using the syllable index DB 202 and the syllabic answer type dictionary DB 204. After generating the syllable index DB 202 and the syllabic answer type dictionary DB 204, the syllable extractor 201 extracts a predetermined size (3 bytes) of the syllable from the morpheme at step S302. The syllable index searching unit 203 searches the syllable index DB 220 at step S303. The answer type dictionary searching unit 205 outputs the answer type recognition result when there is an answer type vocabulary in the answer type dictionary at step S304.

Figure 12B:
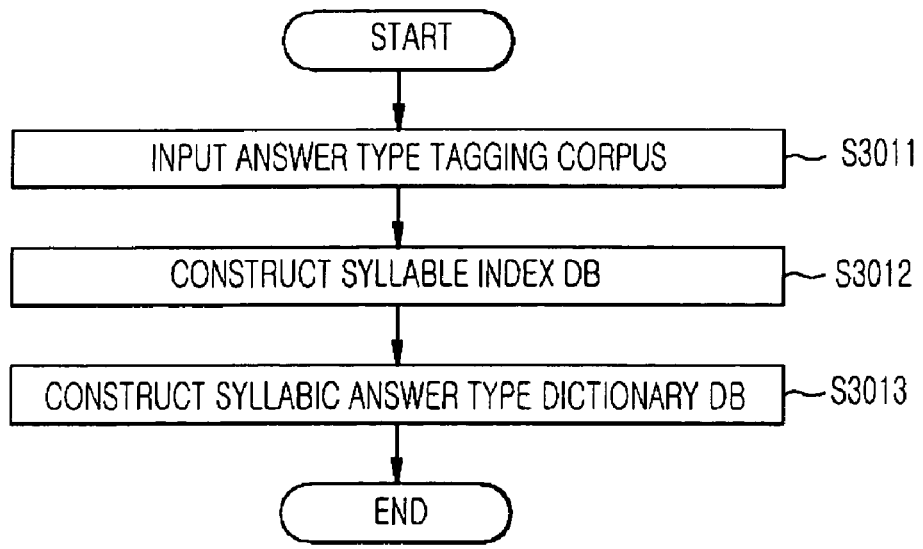

FIG. 12b is a detailed flowchart showing the learning data of syllabic answer type construction step S301 in FIG. 12a.

As shown in FIG. 12b, when an answer type tagging corpus is inputted at step S3011, the syllable index DB 202 is constructed by using the inputted answer type tagging corpus at step S3012. Also, the syllabic answer type dictionary DB 204 is constructed by using the inputted answer type tagging corpus at step S3013.

The syllable index DB 202 is constructed by extracting a predetermined size (3 bytes) of syllable index from answer types larger than 4 bytes among answer type tagged to the answer type tagging corpus at step S3012. Simultaneously, the syllabic answer type dictionary DB 204 is constructed by extracting an answer type entry of corresponding syllable at step S3013.

The syllabic answer type recognition step S300 is used for recognizing multi syllabic answer type having a size larger than 4 bytes and for overcoming a morpheme error for unregistered vocabularies of answer type target vocabularies. For example, in case of the event answer type "10 센트 은화 찬조 운 동" ("10 cents contribution campaign" in English), the event answer type is a syllable "_조 운동'" and a length of corresponding answer type is '18' is stored in the syllable index DB 202. After storing the length of the answer type, it determines whether the indexes are existed in the inputted text. Accordingly, the number of accessing to the dictionary DB becomes decreased and efficiency of answer type recognition becomes increased.

Figure 13A:
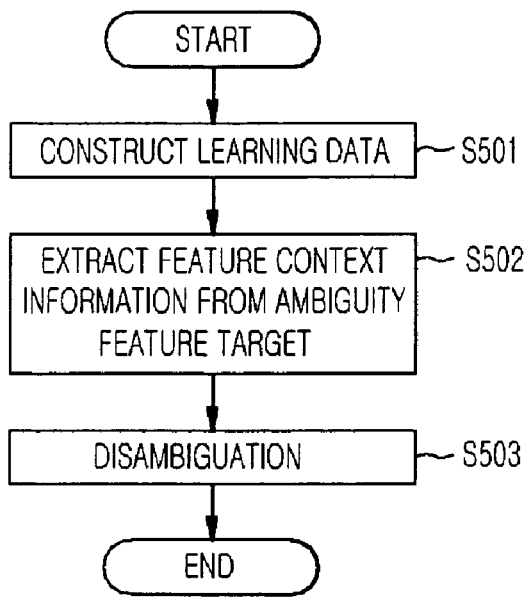
FIG. 13a is a detailed flowchart showing the vocabulary feature disambiguation step S500 in FIG. 11.

FIG. 13a is a detailed flowchart showing the vocabulary feature disambiguation step S500 in FIG. 11.

As shown in FIG. 13a, the feature context statistic information DB 402 is constructed by performing learning data construction step S501. The feature context information extractor 401 extracts feature context information from a target object having a feature ambiguity at step S502. The word feature disambiguation unit 403 disambiguates the vocabulary feature ambiguity by using feature context statistical information stored in the feature context statistical information DB 402 and the feature context information extracted at step S502.

The target object of feature ambiguity is a morpheme having more than two features. The step S500 for disambiguation is performed when the morpheme has more than two features. The disambiguation step can be performed by using various statistical models such as HMM, ME, Navie Bayes model.

Figure 13B:
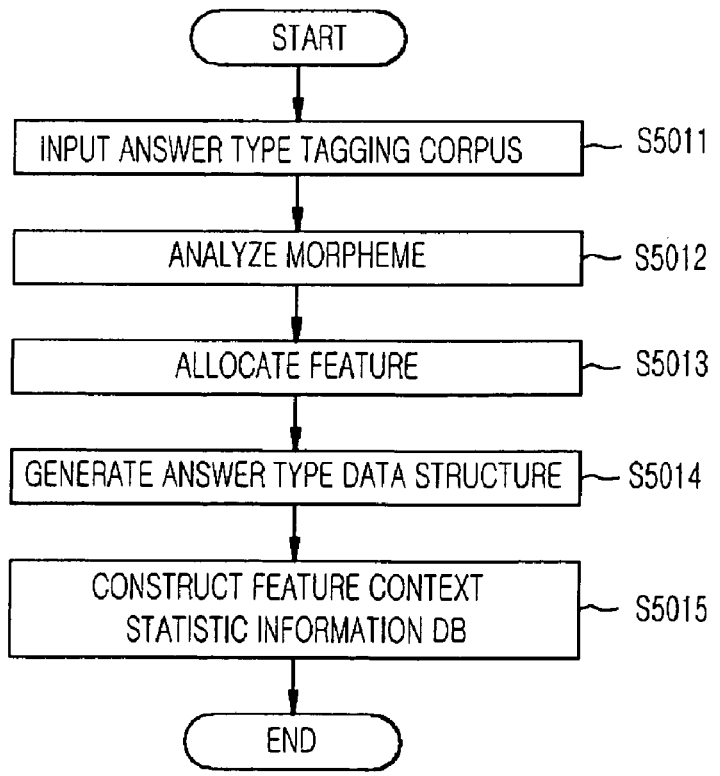

FIG. 13b is a detailed flowchart of the learning data construction step 501 in FIG. 13a.

As shown in FIG. 13b, when an answer type tagging corpus is inputted at step S5011, morphemes of the inputted answer type tagging corpus are analyzed at step S5012. Features are allocated to the each morpheme by using a feature dictionary at step S5013. An answer type data structure is constructed by using extracted answer type information from the morphemes and tagging information of related features at step S5014. By using the information, the feature context statistical information DB 402 is generated at step S5015.

The feature context information is constructed by combination of a feature vocabulary, a previous vocabulary, a subsequent vocabulary, a predicated vocabulary related to the feature vocabulary. The number of frequency of each vocabulary in the combination and reallocation a value of the number of frequency for a predetermined statistical approaching method are used as a basic data for the vocabulary feature disambiguation step S503.

The vocabulary feature disambiguation step S503 is a necessary function for increasing performance of the pattern rule based answer type recognition step S600 and the statistical answer type recognition step S700. Because that the number of answer types are very large comparing to the number of conventional named entities, mess amount of calculation is required. Accordingly, a speed of recognition may include when a feature is unified instead of additional calculating for processing multi features.

Figure 14A:
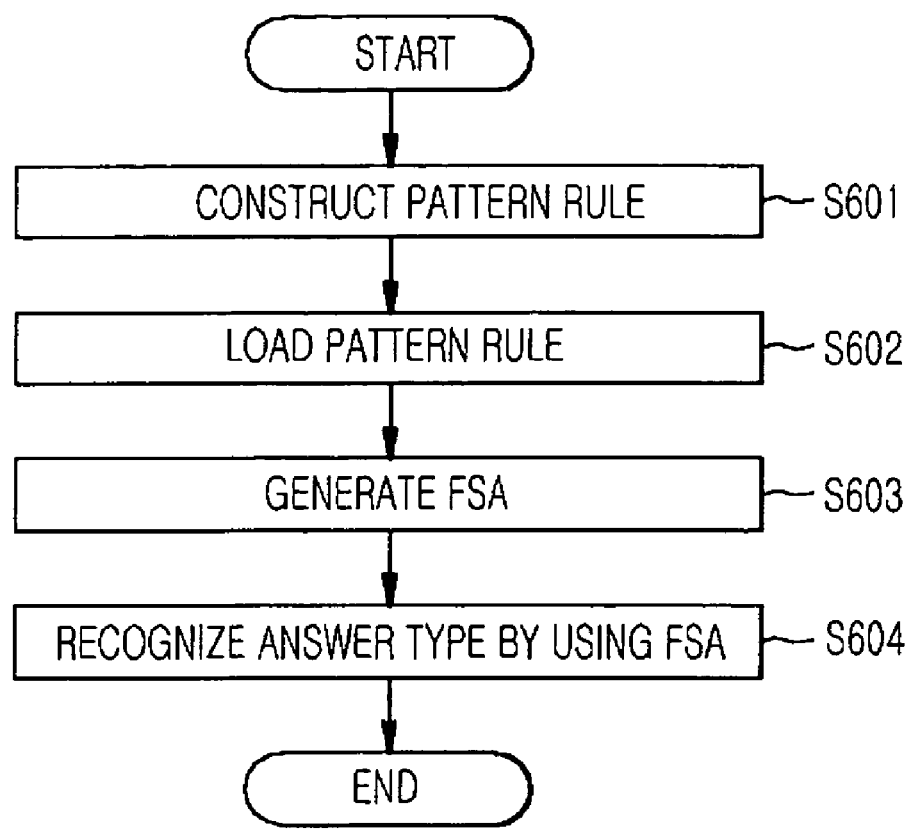
FIG. 14a is a detailed flowchart showing the pattern rule based answer type recognition step S600 in FIG. 11.

FIG. 14a is a detailed flowchart showing the pattern rule based answer type recognition step S600 in FIG. 11.

As shown in FIG. 14a, the pattern rule DB 501 is constructed at step S601. The pattern rule loading unit 502 loads the pattern rule for generating the FSA by using the pattern rule DB 501 at step S602. The FSA generator 503 generates the FSA by using the loaded pattern rule at step S603. The answer type recognizer 503 recognizes the answer type by using the generated FSA and the vocabulary feature disambiguation result at step S604.

Figure 14B:
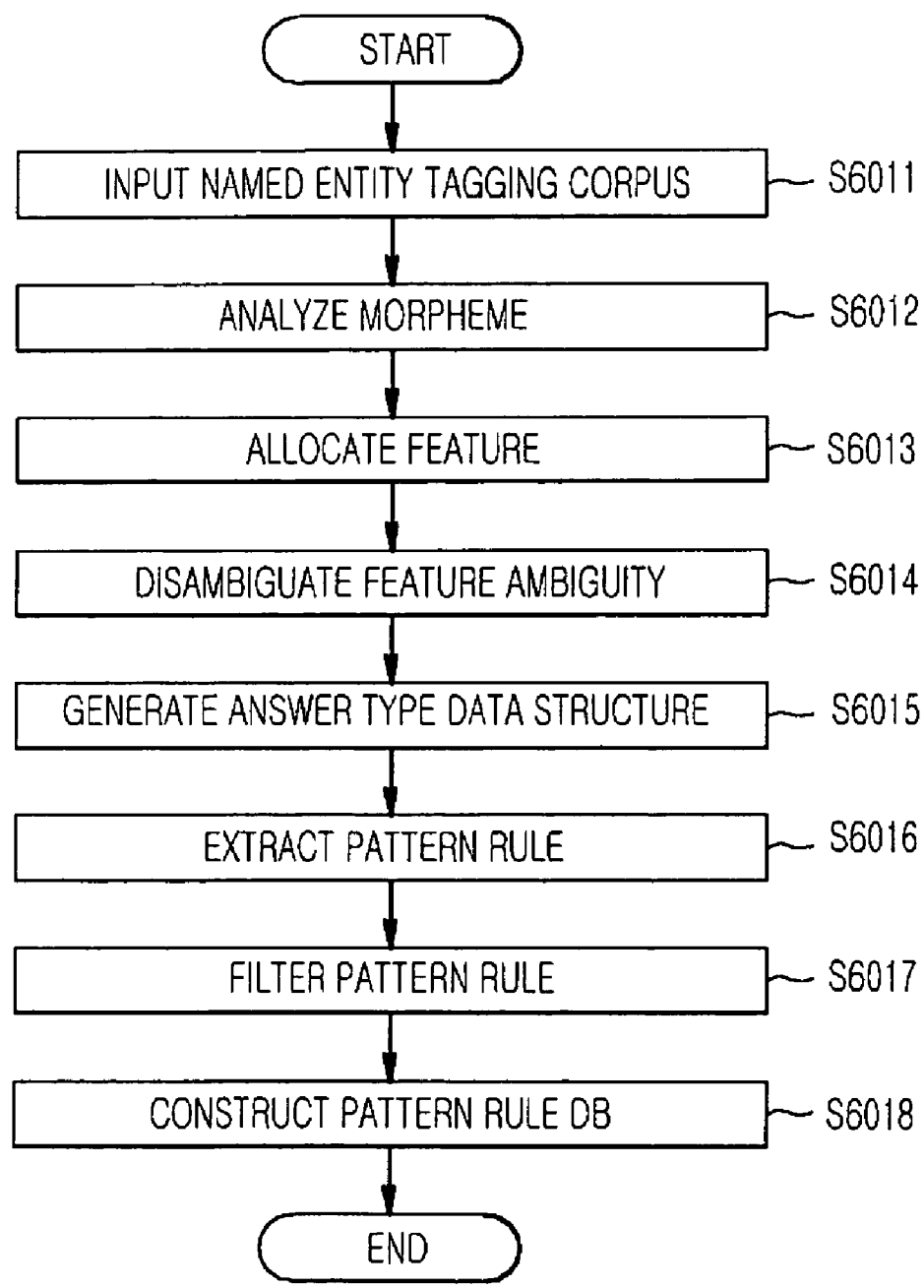

FIG. 14b is a detailed flowchart showing the pattern rule construction step S601 in FIG. 14a.

When the named entity tagging corpus is inputted at step S6011, a morpheme analyzing step S6012, a feature allocation step S6013, a word feature disambiguation step S6014 and an answer type data structure generation step S6015 are performed. After than, a pattern rule extraction step S6016 and a patter filtering step S6017 are performed for filtering the extracted patterns to selects patterns adaptable for regularizing. Finally, the pattern rule DB 501 is generated by regularizing the selects patterns at step S6018.

Various features are extracted in the pattern extraction step S6016 such as a dictionary, a type of vocabulary, a conditional vocabulary, a category of a morpheme and a vocabulary. Because multi syllables of answer type is an object of the pattern rule extraction steps S6016, identical pattern rules may be repeatedly extracted and the extracted pattern may be inadaptable to be regularized, the patter filter step S6017 is required. Accordingly, below equation 1 is used for filtering extracted patterns.

$$\frac{\text{count}(r^i)}{\sum_i \text{count}(r^i)} > \alpha, \text{count}(r^i) > \beta \qquad \text{Eq. 1}$$

In Eq. 1, $r^i$ represents a rule of an answer type category i. count represents the number of appearance of a predetermined pattern. As shown in Eq. 1, the pattern is extracted by pattern $r^i$ at a predetermined category is divided by the number of appearance of the pattern $r^i$ and dividing result is larger than a threshold values $\alpha$ and $\beta$.

Hereinafter, major factors for extracting the answer type rule are explained.

(1) The answer type rule is not only dissolved to internal vocabularies. That is, if an external conditional vocabulary is existed, it must be adapted as the rule. In this case, the external conditional vocabulary becomes a target of pattern rule when the external conditional vocabulary is recognized as an answer type feature at the tagging corpus.

(2) There is insufficient basis to uses a vocabulary as a pattern rule. In this case, a level of the patter rule is decided before approaching. If a vocabulary is included in the pattern rule, an adaptation of the pattern rule becomes decreased. If a rule construction feature target is limited to a vocabulary meaning feature, the adaptation would become increased.

(3) Multi internal features may be existed in internal features of the pattern rule. In this case, single feature is used by using the vocabulary feature disambiguation.

(4) A current rule is deterministic implemented.

FIG. 5b shows an example of a pattern rule for recognizing an answer type.

A pattern rule in the patter rule based answer type recognition steps S600 is constructed as "answer type=word/meaning/feature pattern". AS shown in FIG. 5b, 'DATA=[BC] 47 24' represents that a pattern information of DATA type is 'DATA=[BC] 47 24', '[BC]' is a word 'BC', 47 represents a feature of WFID_OneDigitNum and 24 means a feature of FID-SuffixDate. The shown pattern rule is automatically extracted and constructed from the answer type tagging corpus and recognized as the answer type by being processed as the FSA.

Figure 15A:
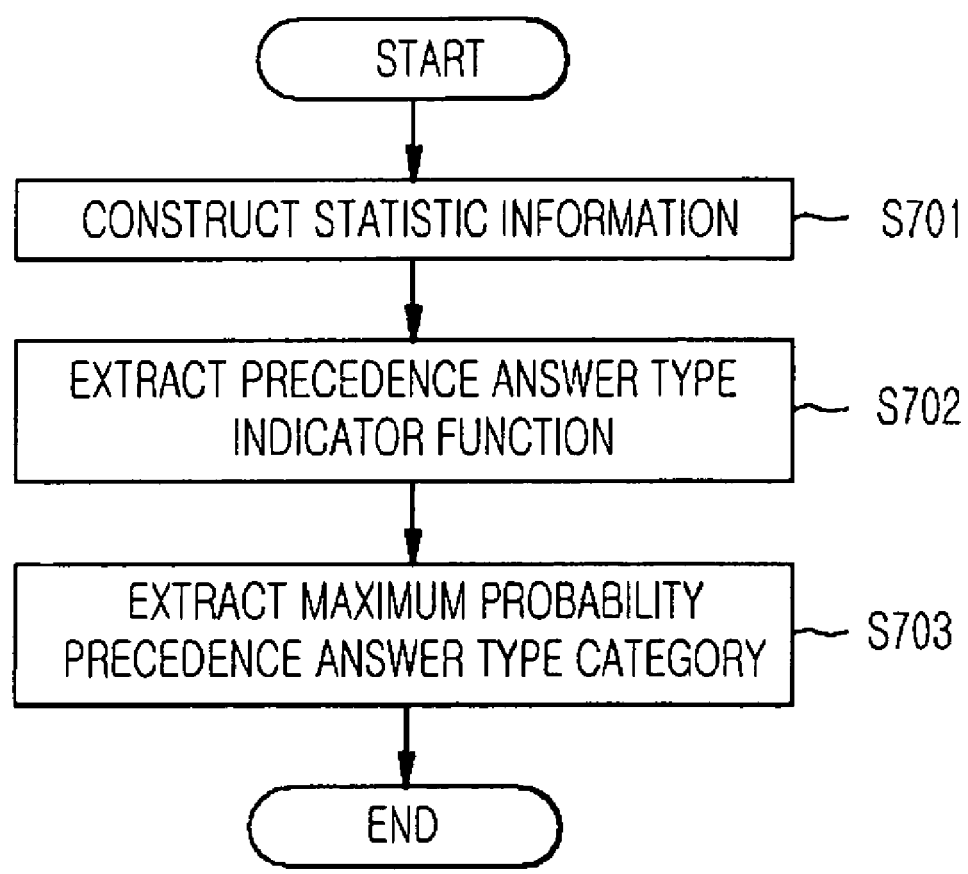
FIG. 15a is a detailed flowchart of the statistic answer type recognition step S700 in FIG. 11.

FIG. 15a is a detailed flowchart of the statistic answer type recognition step S700 in FIG. 11.

At first, a statistic information constructing step S701 is performed to generate the precedence answer type λ vector DB 602.

The precedence answer type indicator function extractor 601 performs a precedence answer type indicator function extraction steps S702 for extracting a precedence answer type indicator function by using the result of feature disambiguation. The maximum probability precedence answer type category extractor 603 performs a maximum probability precedence answer type category extraction step S703 for extracting the maximum probability precedence answer type by using the precedence answer type λ vector stored I the precedence answer type λ vector DB 602 and the precedence answer type indicator function predicted at the precedence answer type indicator function extraction step S702.

Figure 15B:
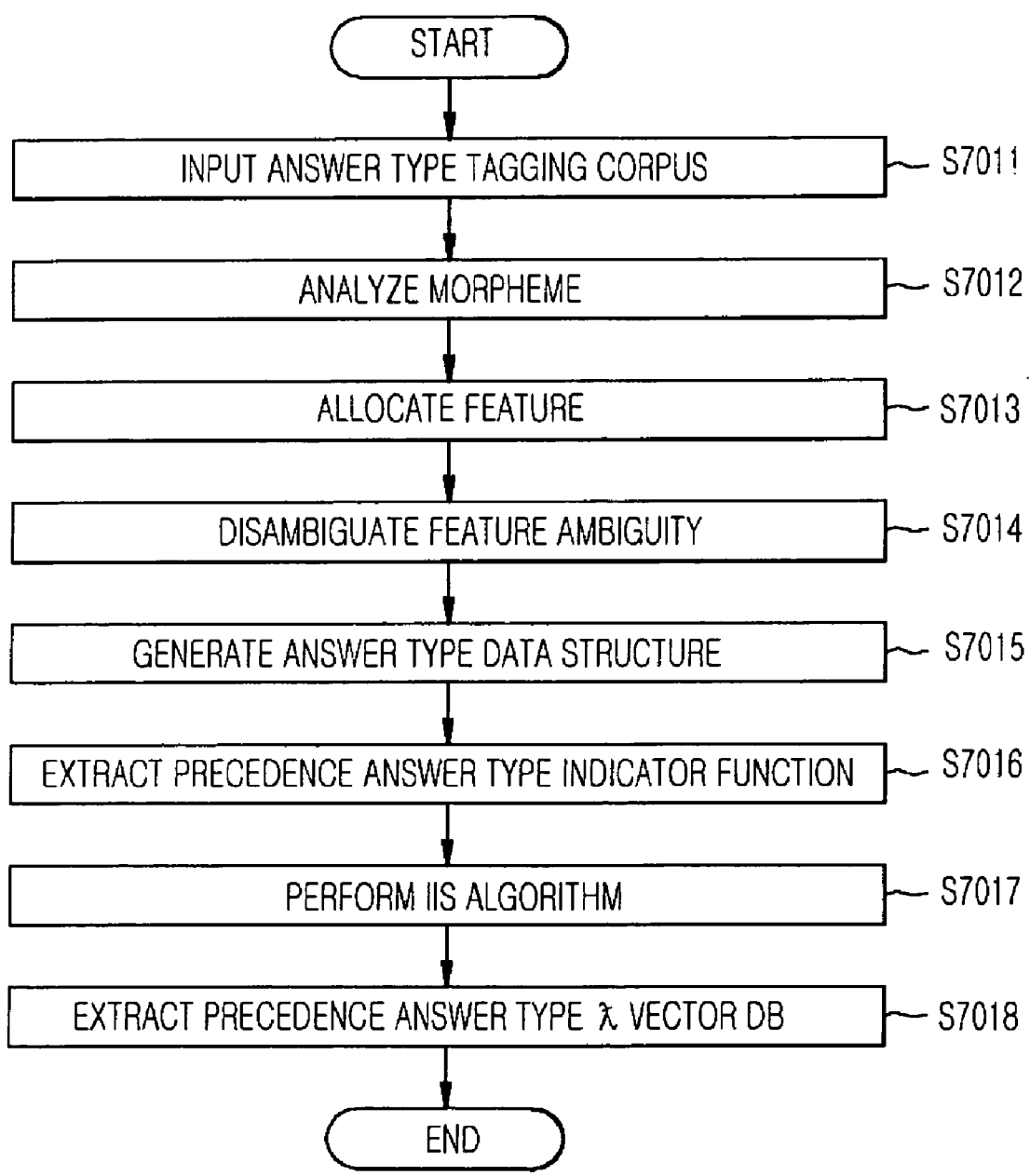

FIG. 15b is a detailed flowchart for explaining the statistic answer type recognition step S701 in FIG. 15a.

When the answer type tagging corpus is inputted at step S7011, the precedence answer type λ vector DB 602 is constructed by performing a morpheme analyzing step S7012, a feature allocation step S7013, a feature disambiguation step S7014, an answer type data structure generation step S7015, a precedence answer type indicator function extraction step S7016, an IIS algorithm performing step S7017 and a precedence answer type λ vector DB construction step S7018.

The ME model is used as a statistical model. In fields of NLP, IR and Speech, a conditional model such as the ME model or a discriminative probability model has been widely used. The ME model has characteristics including easy unification of various language features and high performance. Also, the ME model makes it possible to automatically generate a language independent NLP module. The discriminative probability model allows a probability of hidden structure of given data based on the given data. In contrary, a Joint (generative) model such as a conventional n-gram model, Naive Bayes classifiers, HMM and PCGF generates observe data from hidden structure and allocates a probability to each data and the hidden structure. Generally, it has been widely known that a performance of the conditional model is superior that a performance of the joint mode in a NLP area.

Features are expressed as an indicator function having a real number connected with a category x and an observe value y in the ME model. It is expressed as f(x, y). Generally, it has a value of 1 when feature values of data are matched and it has a value of 0 when feature values of data are not matched. That is, decision of data is progressed based on features activated at a predetermined point in the feature based model. For example, in case of a named entity recognition, the features are constructed with a current word, a previous word, a subsequent word, a previous class, a subsequent class, a current morpheme category, a letter, n-gram features of letter and a word type such as capital, alphabet or number. Weights are automatically allocated to the features through learning data in order to be used as an unified feature. The indicator functions are constructed with the learning data. The learning data $f_i(x,y)$ would have a corresponding weight $\lambda_i$ based on the iterative scaling algorithm (IIS). Also, the data are implemented as a below equation 2 and used for estimating a category x.

$$P_\lambda(y \mid x) = \frac{1}{Z_\lambda(x)} \exp\left(\sum_i \lambda_i f_i(x, y)\right) \quad \text{Eq. 2}$$

$$Z\lambda(x) = \sum_y \exp\left(\sum_i \lambda_i f_i(x, y)\right)$$

FIG. 6b is a table showing context features of an answer type target vocabulary used for statistic answer type recognition.

A feature may be constructed with a part of speech of a morpheme, a vocabulary of a morpheme, a feature unit, a part of speech of adjacent morpheme, a vocabulary of adjacent morpheme and a feature unit of adjacent morpheme. The indicator function f(x,y) is constructed with a history y and an estimated answer type x. The x is further classified to start, continue, end or unique. It is a required encoding method because a single answer type is constructed with complex morphemes. For example, a PS_NAME is classified to tagging categories such as $PS\_NAME_{START}$, $PS\_NAME_{CONTINUE}$, and $PS\_NAME_{UNIQUE}$. An indicator function template can be generated from the table in FIG. 6b. For example, if a current morpheme is a noun NN, an indicator function f(x,y)={1x=$PERSON_{START}$ & y=NN, 0 else} is generated.

Figures 6C, 6D:
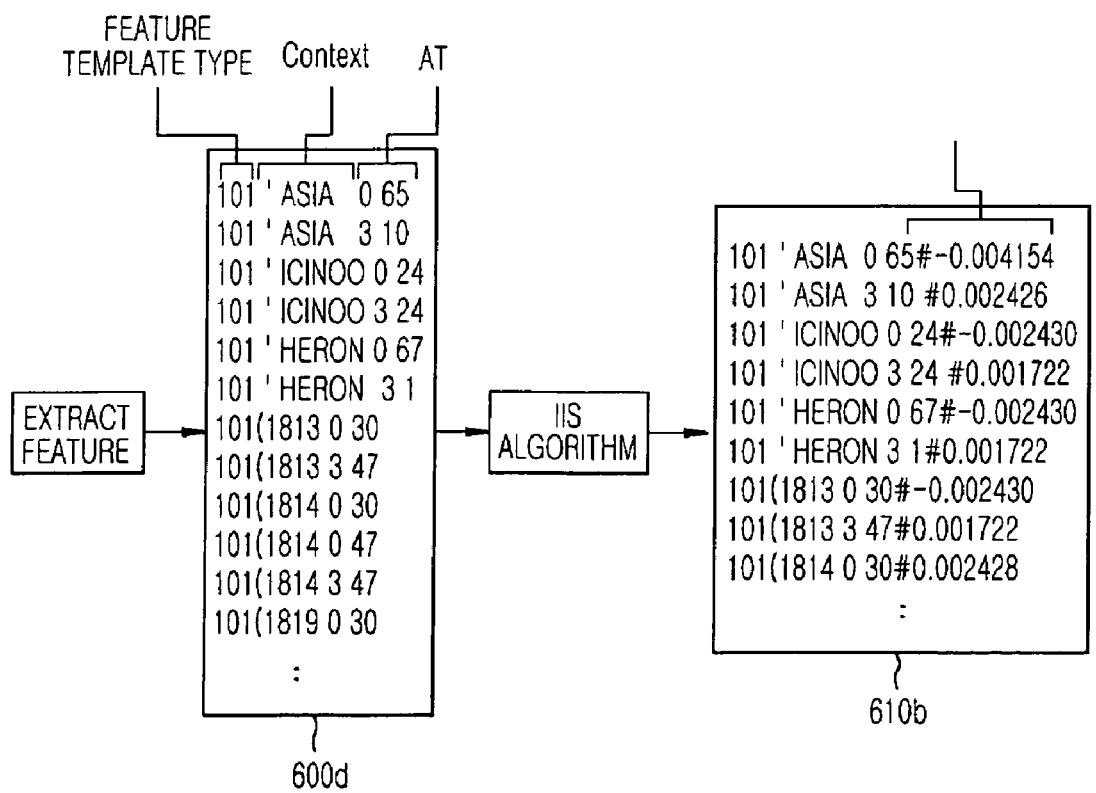

FIG. 6c shows types of context feature templates implemented to a maximum entropy statistic model and FIG. 6d shows a feature list implemented to the maximum entropy statistic model and weights allocated to the feature list.

There are 9 forward types, 9 backward types and 3 current types as a ME feature template used to statistic answer type recognition. The template is described as a $X_i$ form. There are T, L, F and P as a type of X. T represents an answer type category, L is a vocabulary, F is a feature and P represents a morpheme category. And, when i is −1, it represents a previous context and when i is 0, it presents a current context. Also, when i is 1, it represents a subsequent context. As shown in FIG. 6d, a result of feature extraction is constructed with a type of feature template, a context and an AT type. In case of the result of feature extraction '101' '아시아'0 65' in FIG. 6d, 101' represents forward $L_{-1}L_0T_0$. Also, $L_{-1}$ becomes "", $L_0$ becomes to '아시아'and $T_0$ becomes '0 65'. In here, 0 is start and 65 is LOCATION. That is, it represents $LOCATION_{START}$.

The indicator functions are generated from corpus according to feature types and the number of frequency is calculated. After calculating the number of frequency, the weight λA vector of each feature is generated based on the improved iterative scaling (IIS) algorithm.

Figure 16A:
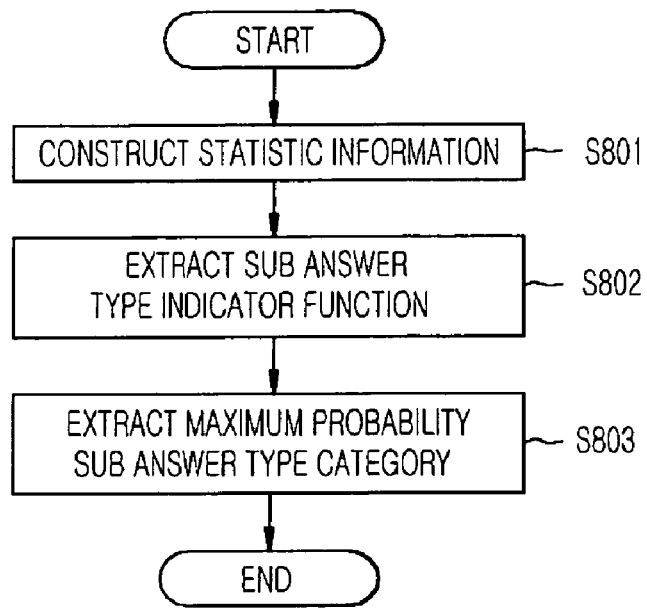
FIG. 16a is a detailed flowchart showing the answer type sub category recognition step S800 in FIG. 11.

FIG. 16a is a detailed flowchart showing the answer type sub category recognition step S800 in FIG. 11.

At first, a statistic information construction step S801 is performed for generating a sub answer type λ vector DB 702. The sub answer type indicator function extractor 701 performs a sub answer type indicator function extraction step S802 for extracting a sub answer type indicator function by using a result of the ME based answer type recognition. The maximum probability sub answer type category extractor 703 performs a maximum probability sub answer type category generation steps S803 for outputting a maximum probability answer type category by using the extracted sub answer type indicator function and the sub answer type λ vector stored in the sub answer type λ vector DB 702.

The answer type sub category recognition step S800 includes a learning step identical to the general answer type recognition step. Only difference is a recognition region. That is, the answer type sub category recognition step S800 further classifies recognized result of general category of answer type DATE to DT_DURATION, DT_DAY, or DT_MONTY. However, a type of feature and a static indicator function are used identically to general answer type recognition. In here, answer type tagging corpus tagged with sub category are required.

Figure 16B:
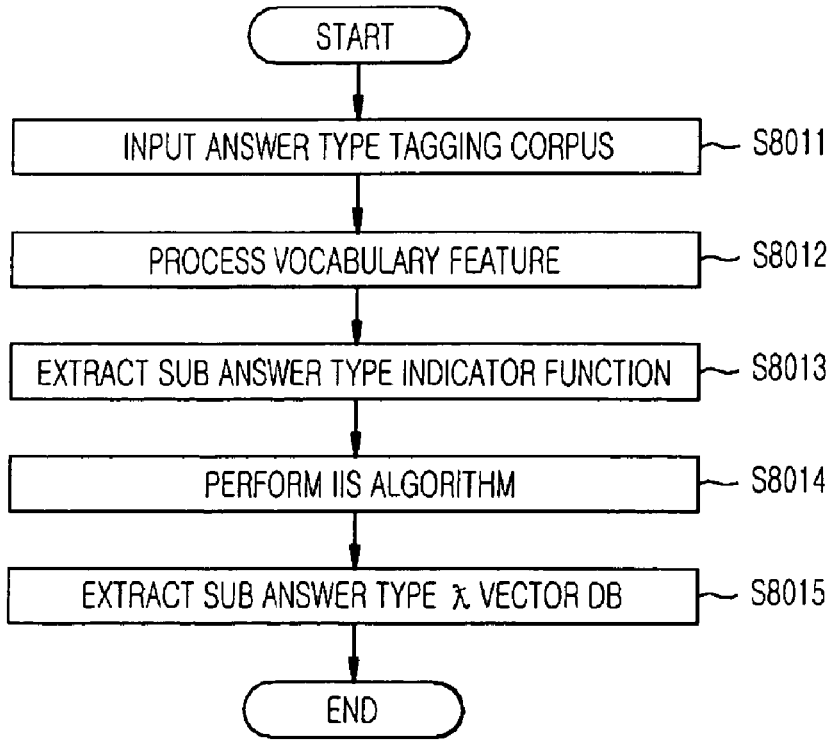

FIG. 16b is a detailed flowchart of the statistic information construction step S801 in FIG. 16a.

When an answer type tagging corpus is inputted at step S8011, the sub answer type λ vector DB 702 is generated by performing a vocabulary feature processing step S8012, a sub answer type indicator function extracting step S8013, an IIS algorithm performing step S8014 and a sub answer type λ vector DB constructing step S8015.

The present invention learns general category answer type by using the answer type tagging corpus tagged with the sub answer type category and also learns the sub answer type by using identical answer type tagging corpus. It is because that a result of tagging the sub category may be mapped to general answer type. Accordingly, the present invention introduces a method identically using the indicator function, the statistic learning and the answer type recognition step for learning two modules and recognition method excepting the answer type tagging.

FIGS. 8a to 8o show answer type used to a question and answer system.

There are 15 general categories of an answer type and approximately 160 sub categories of an answer type by classifying the general categories of the answer type to sub categories. They are constructed for processing various questions of the question and answer system. For recognizing various answer types, using single predetermined model may not generate superior results. Accordingly, the present invention recognizes 160 answer types by using various approaching method such as dictionary searching, pattern rule, statistical model and sub category recognition.

FIG. 9 is a table showing a sub feature type for recognizing an answer type.

The sub feature includes a text type feature, an answer type feature, a union noun/suffix feature, an adjacent noun feature and a vocabulary meaning feature. The sub feature type of target vocabulary is recognized by using a feature dictionary and analyzing a vocabulary form. The recognized feature may include more than one feature and be stored by being connected to the target vocabulary.

The text type feature is a morphologic classification of a vocabulary. The answer types of date or volume is easy to be recognized by analyzing the morphologic character of answer type. WFID_OneDigitNum represents a feature constructed with one number and WFID_TwoDigitNum represents a feature constructed with two numbers.

The answer type feature is a feature for using an answer type dictionary. Therefore, the answer type dictionary must be previously constructed. For example, a list of person names or a list of place names is previously constructed and they are used for allocating features. FID_PS_NAME represents a feature of a person name and FID_FE_SCIENCE represents a feature of study name of science field.

The union noun/suffix feature is a feature of internal constitutional vocabulary or suffix frequently used in the answer type. For example of '천원' meaning of one thousand won, '원' represents a Korea monetary unit and it has a feature value as 'SuffixMoney'.

The adjacent noun feature is a feature of vocabulary frequently used among constitutional vocabularies adjacent to the answer type. For example of '이건희 사장' meaning a president Lee gun-hee, '사장' (president) is the adjacent noun representing a position of a person '이건희' (Lee gun-hee) and it has the adjacent noun feature as 'PositionPERSON'.

The vocabulary meaning feature requires a previously constructed vocabulary meaning dictionary. The vocabulary meaning feature is required for disambiguation between a target vocabulary of the answer type and a general noun and for expending implementation targets of pattern rule. For example, a name of person '이유' has ambiguity with a general noun '이유' meaning a reason. By using the vocabulary meaning feature, it determines whether '이유' has ambiguity or not. Therefore, the vocabulary meaning feature is used for disambiguation.

FIG. 10 shows an example of an answer type tagging document for extracting various linguistic information for recognizing an answer type.

In FIG. 10, a predetermined area of encyclopedia is used as an answer type target document. The answer type is bracketed by "<>" and described as <answer type target vocabulary: answer type>. The answer type tagging document is used for recognizing context of a predetermined answer type by analyzing morpheme, allocating features, disambiguating features and processing an answer type tagging.

As mentioned above, the present invention is a hybrid apparatus for recognizing Korean answer types, which is unified with the syllabic answer type recognition scheme based on effective answer type dictionary searching, the vocabulary feature recognition scheme for allocating features to morphemes, the vocabulary feature disambiguation scheme for limiting multiple vocabulary features to single feature, the pattern rule based answer type recognition scheme for recognizing answer type regularized as regular form, a statistic answer type recognition scheme progressed by collecting statistical information from answer type tagging corpus and the answer type sub category recognition scheme for re-recognizing the general category of the answer type to the sub category of the answer type.

Also, the present invention is an answer type recognition apparatus adaptable to a question and answer system requiring mess amount of categories.

Furthermore, the disambiguation scheme and the statistic sub category recognition scheme in the present invention are distinguishable from a conventional named entity recognition system, and they may overcome technical limitation of an application system requiring complicated information extracting scheme such as a question and answer system or a text mining system.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A hybrid apparatus for recognizing answer type, the apparatus comprising:
   a morpheme analyzer for analyzing morphemes of an input text;
   a syllabic answer type recognizer for extracting a predetermined size of syllable from a morpheme list analyzed by the morpheme analyzer and recognizing an answer type based on the extracted syllable;
   a vocabulary feature recognizer for allocating corresponding feature to each of morphemes constructing the morpheme list and recognizing the corresponding feature of each morpheme;
   a vocabulary feature disambiguation unit for disambiguating vocabulary feature ambiguity of morphemes having more than one feature recognized at the vocabulary feature recognizer;
   a pattern rule based answer type recognizer for recognizing an answer type by comparing a consecutive sequence of the morphemes and a consecutive sequence of constitutional features connected to the morphemes with a pre-constructed pattern rules;
   a statistic answer type recognizer for recognizing an answer type by implementing a statistic model to the consecutive sequence of the morphemes and the consecutive sequence of constitutional features connected to the morphemes; and
   an answer type sub-category recognizer for recognizing a sub-category of the recognized answer type classified to general category at the statistic answer type recognizer.

2. The apparatus of claim 1, wherein the syllabic answer type recognizer includes:
   a syllable extractor for extracting a predetermined size of syllable from each of morphemes included in the morpheme list analyzed at the morpheme analyzer;
   a syllable index DB constructed by extracting a second predetermined size of syllable index from answer types having larger than a first predetermined size tagged to an answer type tagging corpus;
   a syllable index searching unit for inquiring the syllable index DB;
   a syllabic answer type dictionary DB constructed by extracting answer type entry according to corresponding syllable; and
   an answer type dictionary searching unit for searching the syllabic answer type dictionary DB and outputting a syllabic answer type recognition result when an answer type vocabulary is existed in the syllabic answer type dictionary DB.

3. The apparatus of claim 1, wherein the vocabulary feature recognizer includes:
   a feature dictionary DB which is pre-constructed; and
   a feature allocating unit for allocating corresponding feature to each of morphemes included in the morpheme list by searching the feature dictionary DB.

4. The apparatus of claim 1, wherein the vocabulary feature disambiguation unit includes:
   a feature context information extractor for extracting a feature context information from the target of feature ambiguity;
   a feature context statistic information DB pre-constructed by extracting feature context statistic information by using information of answer type data structure; and
   a feature disambiguation unit for disambiguating feature ambiguity by using the extracted feature context information and the stored feature context statistic information.

5. The apparatus of claim 1, wherein the pattern rule based answer type recognizer includes:
   a pattern rule DB pre-constructed by extracting pattern rules and filtering the extracted pattern rules;
   a pattern rule loading unit for loading the stored patter rule in the pattern rule DB;
   a FSA generator for generating a FSA by using the loaded pattern rule; and
   an answer type recognizer for recognizing an answer type by using the feature disambiguation result and the generated FSA and outputting the recognized answer type.

6. The apparatus of claim 5, wherein the patter rule is constructed as 'answer type=vocabulary/meaning/feature pattern'.

7. The apparatus of claim 1, wherein the statistic answer type recognizer includes:
   a precedence answer type indicator function extractor for extracting a precedence answer type indicator function by using the feature disambiguation result;
   a precedence answer type λ vector DB pre-constructed by using an IIS algorithm after extracting the answer type indicator function; and
   a maximum probability precedence answer type category extractor for extracting a maximum probability precedence answer type category by using the extracted precedence answer type indicator function and the stored precedence answer type λ vector.

8. The apparatus of claim 1, wherein the answer type sub-category recognizer includes:
   a sub answer type indicator function extractor for extracting a sub answer type indicator function by using a ME based precedence answer type recognized at the statistic answer type recognizer;
   a sub answer type λ vector DB pre-constructed by using an IIS algorithm after extracting the sub answer type indicator function; and
   a maximum probability sub answer type category extractor for extracting a maximum probability sub answer type category by using the extracted sub answer type indicator function and the stored sub answer type λ vector.

9. A hybrid method for recognizing answer type, the method comprising steps of:
   a) analyzing morphemes of an input text;
   b) extracting a predetermined size of syllable from a morpheme list analyzed by the morpheme analyzer and recognizing an answer type based on the extracted syllable;
   c) allocating corresponding feature to each of morphemes constructing the morpheme list and recognizing the corresponding feature of each morpheme;
   d) disambiguating vocabulary feature ambiguity of morphemes having more than one feature recognized at the vocabulary feature recognizer;
   e) recognizing an answer type by comparing a consecutive sequence of the morphemes and a consecutive sequence of constitutional features connected to the morphemes with a pre-constructed pattern rules;
   f) recognizing an answer type by implementing a statistic model to the consecutive sequence of the morphemes and the consecutive sequence of constitutional features connected to the morphemes; and
   g) recognizing a sub-category of the recognized answer type classified to general category at the statistic answer type recognizer.

10. The method of claim 9, wherein the step b) includes the steps of:
    b-1) constructing a syllable index DB and a syllabic answer type dictionary DB by constructing learning data;

b-2) extracting a predetermined size of syllable from each of morphemes included in the morpheme list analyzed at the step a);

b-3) searching the syllable index DB; and b-4) outputting a syllabic answer type recognition result when an answer type vocabulary is existed in the syllabic answer type dictionary DB by searching the syllabic answer type dictionary DB.

11. The method of claim 10, wherein the step b-1) includes the steps of:

b-1-1) constructing a syllable index DB by extracting an syllable index when an answer type tagging corpus is inputted; and b-1-2) constructing a syllabic answer type dictionary DB by extracting an syllabic answer type dictionary by using the extracted syllable index.

12. The method of claim 9, wherein in the step C), corresponding feature is allocated to each morpheme included in the morpheme list by searching a pre-constructed feature dictionary DB.

13. The method of claim 9, wherein the step d) includes the steps of:

d-1) constructing a feature context statistic information DB by constructing learning data;

d-2) extracting a feature context information from a target of feature ambiguity; and d-3) disambiguating a feature ambiguity by using the extracted feature context information and the stored feature context statistic information in the feature context statistic information DB.

14. The method of claim 13, wherein the step d-1) includes steps of:

d-1-1) analyzing morphemes of an answer type tagging corpus when the answer type tagging corpus is inputted;

d-1-2) allocating a feature to each of the analyzed morphemes;

d-1-3) generating an answer type data structure according to answer type information extracted from features related to the morphemes and tagging information; and d-1-4) constructing the feature context statistic information DB by extracting feature context statistic information based on the generated answer type data structure.

15. The method of claim 9, wherein the step e) includes the steps of:

e-1) constructing a pattern rule DB by constructing pattern rules;

e-2) loading the patter rule stored in the pattern rule DB;

e-3) generating a FSA by using the loaded pattern rule; and e-4) recognizing an answer type by using the feature disambiguation result and the generated FSA and outputting the recognized answer type.

16. The method of claim 15, wherein the step e-1) includes the steps of:

e-1-1) analyzing morphemes of a named entity tagging corpus when the named entity tagging corpus is inputted;

e-1-2) allocating a feature to each of the analyzed morphemes by using a pre-constructed feature dictionary;

e-1-3) disambiguating an ambiguity of the allocated feature;

e-1-4) generating an answer type data structure according to an answer type information extracted from related features of the morphemes and tagging information;

e-1-5) extracting pattern rules from information of the answer type data structure;

e-1-6) regulating patterns suitable to a pattern rule by filtering the extracted patterns; and e-1-7) constructing a pattern rule DB by using the filtered patterns.

17. The method of claim 16, wherein the patter rule is constructed as 'answer type=vocabulary/meaning/feature pattern'.

18. The method of claim 9, wherein the step f) includes the steps of:

f-1) constructing a precedence answer type λ vector DB by constructing statistic information;

f-2) extracting a precedence answer type indicator function by using the feature disambiguation result; and f-3) extracting a maximum probability precedence answer type category by using the extracted precedence answer type indicator function and the precedence answer type λ vector stored in the precedence answer type λ vector DB.

19. The method of claim 18, wherein the step f-1) includes the steps of:

f-1-1) analyzing morphemes of an answer type tagging corpus when the answer type tagging corpus is inputted;

f-1-2) allocating a feature to each of the analyzed morphemes by using a pre-constructed feature dictionary;

f-1-3) disambiguating an ambiguity of the allocated feature;

f-1-4) generating an answer type data structure according to answer type information extracted from related features of the morphemes and tagging information;

f-1-5) extracting a precedence answer type indicator function from information of the generated answer type data structure;

f-1-6) performing a IIS algorithm by using the extracted precedence answer type indicator function; and f-1-7) constructing a precedence answer type λ vector DB by using a result of performing the IIS algorithm.

20. The method of claim 9, wherein the step g) includes the steps of:

g-1) constructing a sub answer type λ vector DB by constructing statistic information;

g-2) extracting a sub answer type indicator function by using a ME based precedence answer type recognized at the step g);

g-3) extracting a maximum probability sub answer type category by using the extracted sub answer type indicator function and the sub answer type λ vector stored in the sub answer type λ vector DB.

21. The method of claim 20, wherein the step g-1) includes the steps of:

g-1-1) processing a vocabulary feature of an answer type tagging corpus when the answer type tagging corpus is inputted;

g-1-2) extracting a sub answer type indicator function from the process vocabulary feature;

g-1-3) performing an IIS algorithm by using the extracted sub answer type indicator function; and g-1-4) constructing the sub answer type λ vector DB by using a result of performing the IIS algorithm.

* * * * *